Feb. 7, 1928.
J. KATZMAN
ELECTRICAL CONDENSER
Filed Nov. 24, 1925
1,658,768
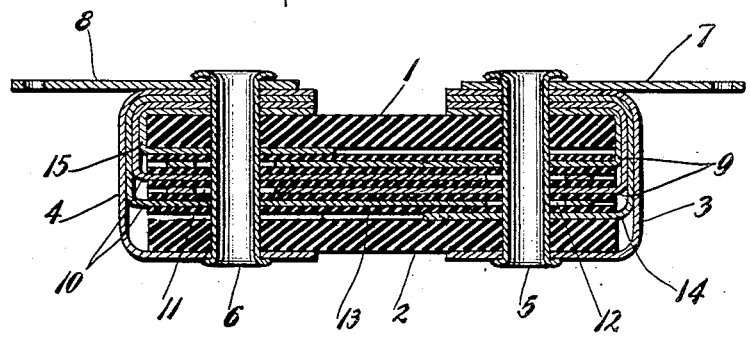
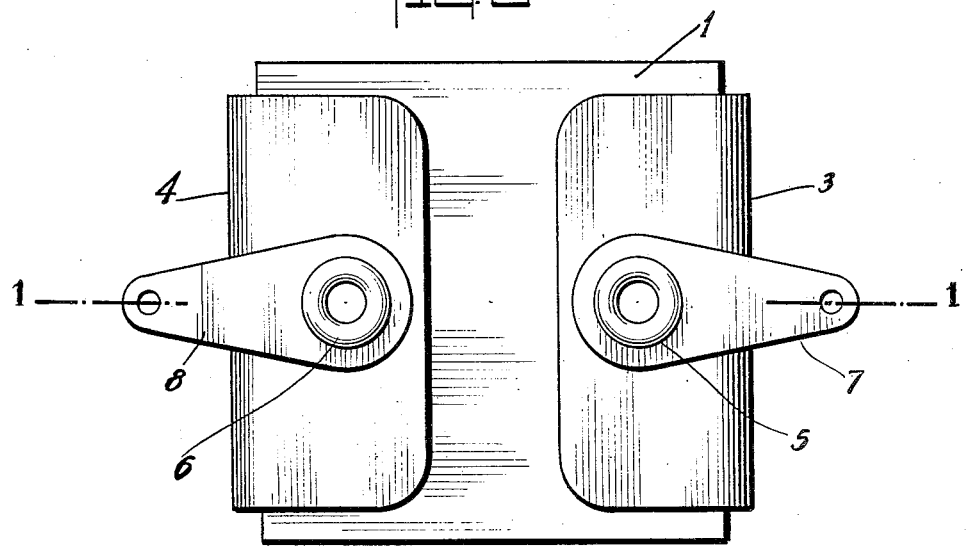
INVENTOR
J. Katzman
BY
ATTORNEY Patented Feb. 7, 1928.

1,658,768

UNITED STATES PATENT OFFICE.

JACOB KATZMAN, OF NEW YORK, N. Y., ASSIGNOR TO DUBILIER CONDENSER CORPORATION, OF NEW YORK, N. Y., A CORPORATION OF DELAWARE.

ELECTRICAL CONDENSER.

Application filed November 24, 1925. Serial No. 71,194.

My invention relates to an improved electrical condenser; especially a condenser of fixed electrostatic capacity, An object of this invention is to provide a condenser of such design as to reduce and practically eliminate the losses in the outside insulation, and this end is preferably attained by shielding such insulating parts of the condenser against the effect of electrostatic stresses occurring when there is a difference of potential at any particular point.

Other objects and advantages will appear from the following description, and the characteristics of the invention will be defined in the appended claims. But the disclosure is explanatory only, and I may vary the structure actually shown to the full extent indicated by the broad and general meanings of the terms in which the claims are expressed.

On the drawings, which present the best form of my invention now known to me,

Figure 1 is a longitudinal section of a condenser according to my invention; taken on the line 1—1 of Figure 2; and Figure 2 is a top plan of same.

The same numerals identify the same parts throughout.

The condenser comprises a pair of cover plates 1 and 2; the former being shown as the upper, and the latter as the lower or bottom plate, in the drawings. These cover plates may be of phenol condensation product or any other good insulating material and between them is disposed the stack of the condenser, comprising electrically conductive elements such as sheets of metal foil separated by sheets of dielectric material, such as mica. At each end of the condenser, are metallic clamping members or clips indicated at 3 and 4 and through the clip 3, the plates 1 and 2, and the sheets of tin foil and mica, is passed a hollow or tubular rivet 5 which secures the clamp in position and holds the plates, the sheets of tin foil and mica together. A similar rivet 6 passes through the clip 4 and the adjacent ends of the cover plates 1 and 2 and all the sheets of tin foil and mica, to serve the same purpose; the opposite extremities of both rivets being expanded to make the clips tight and cause them to press the cover plates and the stack firmly together. The rivet 5 also secures to the clip 3, a tab or lug 7 and the rivet 6 secures in place a similar tab or lug 8; the function of these tabs being to enable conductors to be joined to the condenser and thus connect the condenser in an electric circuit.

The sheets of metallic foil are indicated at 9 and 10, all being insulated from each other by intervening sheets of mica and the ends of the sheets 9 project outward and are folded over upon the cover plate 1 beneath the upper part of the clip 3. The portions of the sheets of foil 9 adjacent the rivet 5 may make contact with this rivet, but the portions of these sheets of foil 9 adjacent the rivet 6 are provided with apertures 11, so that no contact between these sheets and the rivet 6 is permitted. The other sheets of foil 10 project out at the opposite end of the condenser and are folded over upon the outer face of the cover plate 1 beneath the upper portion of the adjacent clip 4; these sheets of foil 10 being in contact with the rivet 6 if desired, but having apertures 12 adjacent the other rivet 5, so as to be out of contact therewith. The sheets of foil 9 and 10, of course, alternate with one another and in between them and between them and the cover plates 1 and 2 are laid the sheets of mica 13.

This type of condenser is shown and described in the patent of William Dubilier, No. 1,497,095, granted June 10th, 1924, and is well known. The sheets of foil 9 are thus connected to the rivet 5 and terminal 7 and the sheets of foil 10 are well insulated from the sheets 9 and all parts in contact therewith, and are electrically united to the rivets 6 and terminal 8.

Since, the clip 3 is joined to the rivet 5 and the sheets of foil 9, it will be seen, by referring to Figure 1, that the lowermost sheet of foil 10 and the lower side of the clip 3 have the lower cover plate 2 between them. This sheet of foil and the lower part of the clip 3, are, of course, of different potentials in practice, and ordinarily an electric stress will exist between this sheet of foil 10 and the lower part of the clip 3, with the result that this electric stress must pass through the lower cover plate 2 and give rise to dielectric losses in said plate. I, therefore, insert a conductive shield 14 in the shape of a piece of foil between the cover plate 2 and the sheet of mica 13 that lies directly beneath the lowermost sheet of foil 10 above-mentioned. This piece of foil 14 also projects out with the ends of the foil 9 and makes good contact with the inside of the clip 3. It will, therefore, be of the same potential as the clip and hence there will be no difference of potential on the inside and outside face of the cover member 2, but only between this shield 14 and the lowermost sheet of foil 10. Hence, only the piece of mica between the shield 14 and the adjacent sheet of foil 10 will be subjected to any electrostatic stress and the losses will, therefore, be greatly reduced.

At the opposite end of the condenser is a similar shield 15, which lies between the inner face of the cover member 1, and the sheet of mica which is placed upon the adjacent or uppermost sheet of foil 9. The upper plate 1 is thus screened in the same way as the lower plate, and the only parts of the condenser which are subject to any stress are the mica plates between the foils 9 and 10.

Having described my invention, what I believe to be new and desire to secure and protect by Letters Patent of the United States, is:

1. A condenser including an insulating member, an electrically conductive element, adjacent one side of said member, a second electrically conductive element having at least a portion thereof adjacent the opposite side of said member, said elements being of different potential, and an electrically conductive shield between the first element and said member, and connected to said second element.

2. A condenser including an insulating cover plate, an electrically conductive element adjacent one side thereof, a second electrically conductive element opposite the first element and insulated therefrom and having a portion extending over into proximity with the opposite side of said member, and an electrically conductive shield connected to the second element and disposed between said member and said first element.

3. A condenser comprising electrically conductive elements insulated from one another, insulating cover plates, conductive clips at the opposite ends of the condenser and engaging said plates, part of said elements being connected to one of said clips and the remainder to the other clip, and an electrically conductive shield attached to each clip and disposed between one of said plates and said elements of a potential different from that of the clip to which said shield is attached.

4. A condenser comprising conductive elements insulated from one another, insulating cover plates, conductive clips at the opposite ends of the condenser and engaging said plates, part of said elements being connected to one clip, and part to the other, an electrically conductive shield in contact with the inner face of one plate adjacent one end thereof, and united to the clip at said end, and a similar shield in contact with the inner face of the other plate at the opposite end of the condenser and electrically connected to the other clip, whereby both cover plates are screened against electrostatic stresses in the condenser.

5. A condenser including an insulating member and conductive elements tending to create a difference of potential on opposite faces of said member, and means extending between said member and one element and connected to the other element for shielding said member.

In testimony whereof I affix my signature.

JACOB KATZMAN.